E. A. BRACKETT.

Improvement in Fish-Ways.

No. 132,349.  Patented Oct. 22, 1872.

Witness: W. E. Boardman, E. G. Pinkham.

Inventor: Edward A. Brackett, by F. Curtis, Atty.

UNITED STATES PATENT OFFICE.

EDWARD A. BRACKETT, OF WINCHESTER, MASSACHUSETTS.

IMPROVEMENT IN FISH-WAYS.

Specification forming part of Letters Patent No. 132,349, dated October 22, 1872.

*To all whom it may concern:*

Be it known that I, EDWARD A. BRACKETT, of Winchester, in the county of Middlesex and Commonwealth of Massachusetts, have invented certain Improvements in Fish-Ways, of which the following is a specification:

The nature and purposes of a fish-way, so called, are, as is well known, to enable fish to overcome the obstacles of a dam and to ascend streams which would otherwise be inaccessible; and the primary object of this invention is to provide a means whereby the otherwise rapid current of the fish-way may be reduced to a sluggish stream of uniform or practically uniform speed throughout, whereby fish may ascend or descend, or rest at their leisure. My improvements consist, first, in extending a fish-way up stream through a dam and so as to extend some distance above the latter, and in providing said fish-way above the dam with a series of water-inlet ports of various heights in order to accommodate the various stages of water and avoid the great pressure which would otherwise result from high water or a flood; and, secondly, the nature of these improvements consist in the construction of the trough or chute of a fish-way by means of an oppositely-arranged series of abutments or bulkheads, or their equivalents, whereby the original current is diverted into a circuitous or sinuous course and a series of eddies produced which retard the speed of said current to any desired extent, substantially as hereinafter stated.

Figure 1:
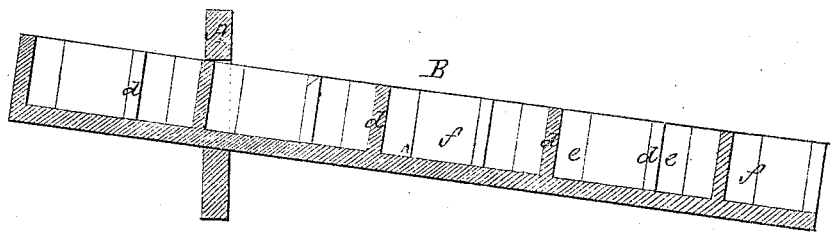
Figure 2:
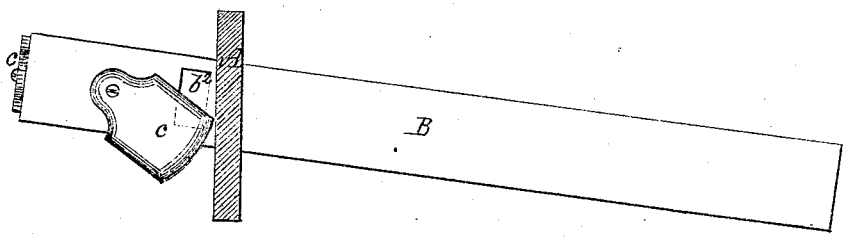
Figure 3:
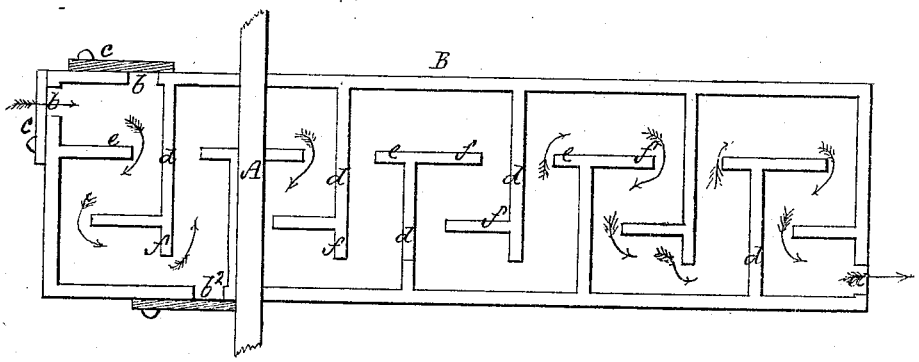

In the drawing accompanying this specification I have represented, in Figure 1, a vertical section; in Fig. 2, a side elevation; and in Fig. 3, a plan of my improved "fish-way."

In these drawings, A is supposed to represent the location of the dam of a river or stream, into which a fish-way is to be introduced.

In carrying out the purpose of my invention I provide a rectangular oblong trough or box, B, closed at the sides and ends, with the exception of one or more water-discharge ports, $a$, at its lower or down-stream end and several water-inlet or supply ports, $b$ $b^1$ $b^2$, &c., at its upper end, the trough or box being placed within the stream in a sloping position and projecting through and extending somewhat above the dam, as shown in the drawing, the slope of the said trough or box being varied with circumstances, the character of the stream, and the velocity to be imparted to the current passing through it. The inlet-ports $b$ $b^1$ $b^2$ before named are placed at different points up and down of the stream, and consequently admit water to the trough at different altitudes, the port $b$ being the highest and receiving the water at the high stage, and the port $b^2$ being the lowest of the series and receiving water when it will not enter the upper one.

Having thus seen how I control and regulate the admission of water to the chute B, I will now explain how I guide its course through the same, and in so doing carry out the primary object of my invention—that of retarding artificially the rapidity of the current. To this end I dispose within the chute or box A, and generally throughout its length, a series of abutments, $d$ $d$ $d$, &c., disposed at regular or irregular distances asunder and extending partially across the width of the chute, the abutment of one side being disposed opposite the recess formed by the two opposite adjacent abutments. The abutments $d$ are not limited in number nor arbitrarily in position, but are arranged substantially as stated. Each abutment or deflector $d$ is formed with one or more bends or wings, $e$ $f$, &c., which extend longitudinally or thereabout of the length of the chute, in order that the current of water intercepted by the abutment shall be compelled to take an upward or return movement for a short distance before passing to the next ensuing abutment to be again intercepted and diverted. In this manner the current of water entering the head of the chute is continually interrupted and diverted from a direct course, a series of eddies being the result, following each other in such rapid succession as to retard the current throughout the entire chute. As the only headway the water can attain is in passing from one abutment or deflector to another, and as these may be so near to each other as to almost entirely reduce the stream to a continuous series of eddies, the water makes its exit from the chute at about the same velocity with which it courses through the upper part thereof, and this velocity may of course be increased or diminished, according to the number of deflectors.

In a chute or fish-way constructed essentially as above described the fish encounter very little resistance to their passage and the eddies allow them to remain at rest at any time. In fact, in fish-ways now in actual use on this principle, thousands of fish are found in the proper season to be both ascending and descending the chute at the same time.

Claims.

1. In a fish-way which is extended through the dam of a water-course and some distance above the same, as described, I claim the ports $b\ b^1\ b^2$, arranged substantially as shown, whereby the water is admitted through one or more, according to conditions in its height, as set forth.

2. In a fish-way provided with a series of deflectors, $d$, for causing the water to take a sinuous course through the same, I claim the wings $e\ f$, formed on or attached to said deflectors, substantially as and for the purposes herein set forth.

E. A. BRACKETT.

Witnesses:
   W. E. BOARDMAN,
   E. G. PINKHAM.